Sept. 20, 1927.
C. B. CORCORAN
TYPEWRITING MACHINE
Filed June 20, 1925
1,643,005
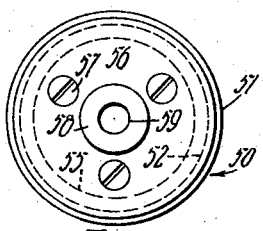
Fig. 2.
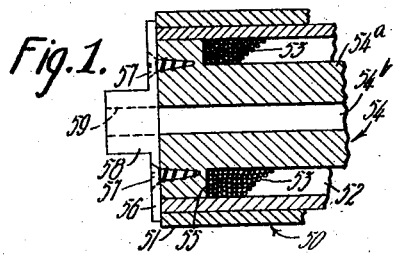
INVENTOR.
Cornelius B Corcoran
BY by Michael J Corcoran
Administrator
BC Stickney
ATTORNEY.

Patented Sept. 20, 1927.

1,643,005

UNITED STATES PATENT OFFICE.

CORNELIUS B. CORCORAN, DECEASED, LATE OF NEW YORK, N. Y.; BY MICHAEL J. CORCORAN, ADMINISTRATOR, OF BROOKLYN, NEW YORK, ASSIGNOR TO UNDERWOOD TYPEWRITER COMPANY, OF NEW YORK, N. Y., A CORPORATION OF DELAWARE.

TYPEWRITING MACHINE.

Application filed June 20, 1925. Serial No. 38,428.

This invention relates to platens for typewriting machines, and has for an object the provision of a platen simply made of inexpensive material, which may be relatively noiseless, and giving clearness of type-impressions.

According to the present invention, provision is made of a platen having a wooden core over which thread is wrapped. A soft rubber sleeve is slipped over this thread wrapping and the whole is encased by a close fitting jacket or shell, preferably made of hard rubber and forced thereon. This type of platen is good for both manifolding and noiseless typing.

Other features and advantages will hereinafter appear.

In the accompanying drawings,

Figure 1 is a fragmentary sectional view, shown partly in elevation, of a typewriting machine platen embodying the present invention.

Figure 2 is an illustration of either end of the platen shown in Figure 1.

In the drawings is illustrated a form of platen 50 for a typewriting machine embodying features of the present invention, which may be simply constructed of a few light inexpensive parts and have good sound-deadening properties and yet be suitable for manifolding work. The platen 50 may include a spool-like core 54 of wood, having an axial bore 54$^b$ and a flange 55 at each end. Around the drum 54$^a$ may be tightly wrapped several layers of heavy thread 53, and a closely fitting soft rubber sleeve 52 may be slipped over the flanges 55 and the thread layers 53. A tightly fitting facing jacket 51 of hard rubber may be pushed over the sleeve 52. The thread layers and the soft rubber sleeve over it are both adapted to absorb sound vibrations of the facing jacket. The core 54, the sleeve 52 and the jacket 51 will preferably be of the same length. End plates 56 having hub members 58 are fastened to the core 54 by screws 57. The hubs 58 may have axial holes 59 aligned with the axial bore 54$^b$ of the core through which may be inserted a platen-shaft (not shown) for mounting the platen 50 in a typewriter.

Variations may be resorted to within the scope of the invention, and portions of the improvements may be used without others.

Having thus described the invention, I claim:

1. A platen for a typewriting machine, including a spool-like core of wood having a flange at each end, layers of tightly wrapped thread around said core, arranged to fill the space between said flanges, a sleeve of closely fitting soft rubber around said flanges and said thread layers, and a closely fitting facing jacket of relatively hard rubber over said soft rubber sleeve.

2. In a platen for a typewriting machine, the combination with a facing jacket of relatively hard rubber, of a spool-like core having a flange at each end, layers of tightly wrapped thread around said core between its flanges, and a closely fitting soft rubber sleeve around said thread layers arranged to form a sound-absorbing backing for said facing jacket.

3. In a platen for a typewriting machine, the combination with a facing jacket, of a wooden spool-like core having a flange at each end, sound-absorbing layers of thread wrapped tightly around the portion of said core between its flanges, the outer surfaces of said thread layers being flush with the periphery of said flanges, a soft rubber sleeve fitted closely over said flanges and said thread layers, and means attached to said core for mounting said platen on a shaft.

MICHAEL J. CORCORAN,
*Administrator of the Estate of Cornelius B. Corcoran, Deceased.*